(12) United States Patent
Amidaiji et al.

(10) Patent No.: US 8,110,638 B2
(45) Date of Patent: Feb. 7, 2012

(54) CURABLE COMPOSITION, ANTIFOULING PAINT COMPOSITION, ANTIFOULING COATING FILM, BASE MATERIAL WITH ANTIFOULING COATING FILM AND ANTIFOULING METHOD FOR BASE MATERIAL

(75) Inventors: Katsuyoshi Amidaiji, Ohtake (JP); Shinichi Tashiro, Ohtake (JP); Takafumi Sakamoto, Annaka (JP)

(73) Assignees: Chugoku Marine Paints, Ltd., Ohtake-shi (JP); Shin-Etsu Chemical Co., Ltd., Tokyo (JP)

( * ) Notice: Subject to any disclaimer, the term of this patent is extended or adjusted under 35 U.S.C. 154(b) by 226 days.

(21) Appl. No.: 12/521,123

(22) PCT Filed: Dec. 25, 2007

(86) PCT No.: PCT/JP2007/074871
§ 371 (c)(1),
(2), (4) Date: Jun. 25, 2009

(87) PCT Pub. No.: WO2008/081789
PCT Pub. Date: Jul. 10, 2008

(65) Prior Publication Data
US 2010/0041805 A1 Feb. 18, 2010

(30) Foreign Application Priority Data
Dec. 25, 2006 (JP) ................... 2006-347917

(51) Int. Cl.
*C08G 77/32* (2006.01)
(52) U.S. Cl. ........................................ 525/477
(58) Field of Classification Search .................... 525/477
See application file for complete search history.

(56) References Cited

U.S. PATENT DOCUMENTS

| | | | |
|---|---|---|---|
| 5,218,059 A | 6/1993 | Kishihara et al. | |
| 5,504,176 A * | 4/1996 | Fujiki | 528/18 |
| 6,187,447 B1 | 2/2001 | Stein et al. | |
| 2002/0197490 A1 | 12/2002 | Amidaiji et al. | |
| 2004/0006190 A1 | 1/2004 | Sakamoto et al. | |

FOREIGN PATENT DOCUMENTS

| | | |
|---|---|---|
| JP | 54 48722 | 4/1979 |
| JP | 62 84166 | 4/1987 |
| JP | 1-252677 | 10/1989 |
| JP | 1 306479 | 12/1989 |
| JP | 3-255169 | 11/1991 |
| JP | 4 106156 | 4/1992 |
| JP | 10 67855 | 3/1998 |
| JP | 2001 139816 | 5/2001 |
| JP | 2001 181509 | 7/2001 |
| JP | 2004 43521 | 2/2004 |
| JP | 2006 160983 | 6/2006 |
| JP | 2006 193469 | 7/2006 |
| WO | WO 95/32862 | 12/1995 |

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

[PROBLEM TO BE SOLVED] To provide an organopolysiloxane paint composition capable of forming an antifouling coating film having an excellent long-term antifouling property.

[SOLUTION] A curable composition obtained by mixing:

(A) 100 parts by weight of a reaction curable silicone rubber with:

(B) 1 to 100 parts by weight of an organopolysiloxane mixture including a product obtained by an $R^2OH$ elimination reaction of:

(B1) an organopolysiloxane represented by:

$$(R^2O)((R^2O)_2SiO)_{n-1}Si(OR^2)_3$$

wherein n is an integer of 2 or more and $R^2$ each is independently a monovalent hydrocarbon group, and (B2) an organopolysiloxane having at least one structure represented by:

$$\equiv SiR^3OH$$

wherein $R^3$ is a divalent hydrocarbon group, in a molecule.

29 Claims, 4 Drawing Sheets

[Fig. 1]
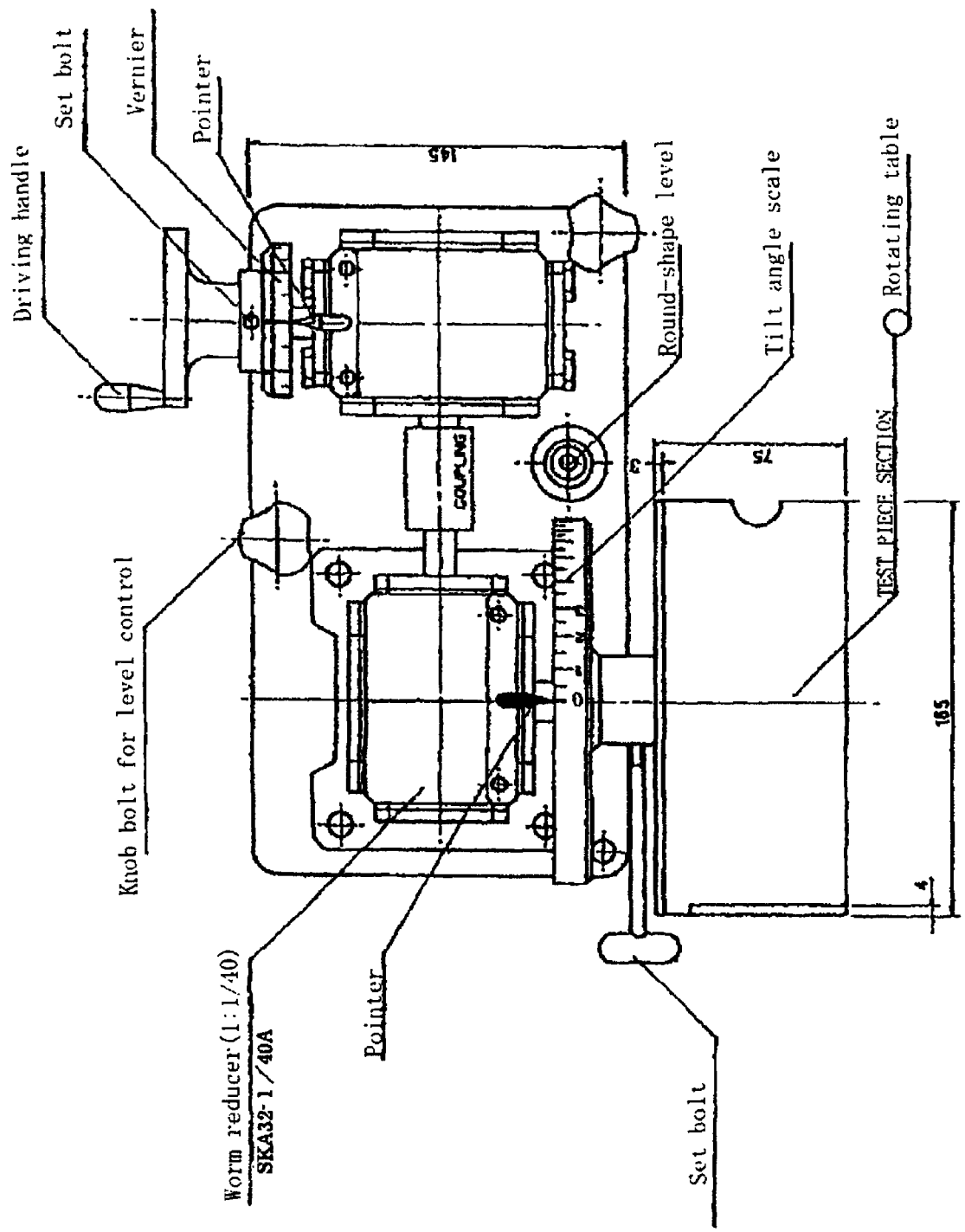

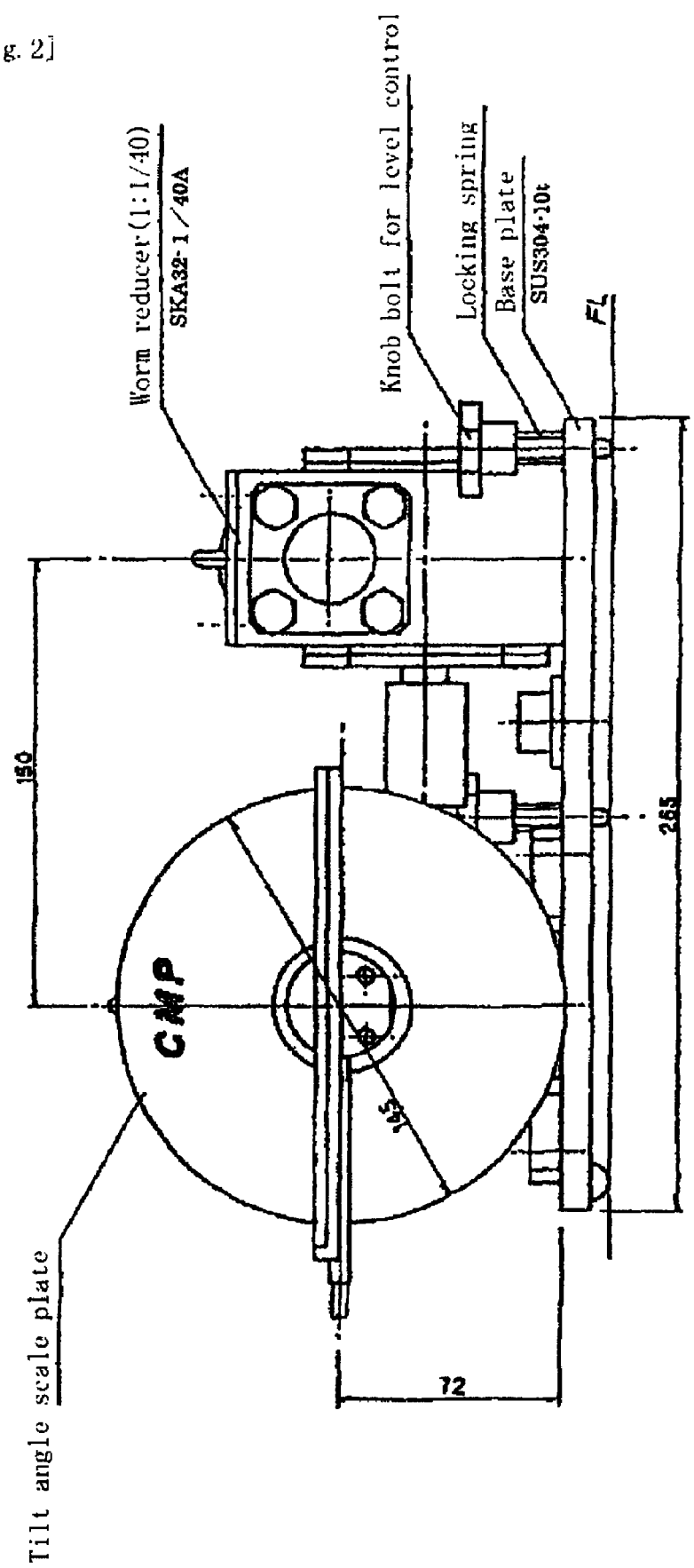
[Fig. 2]

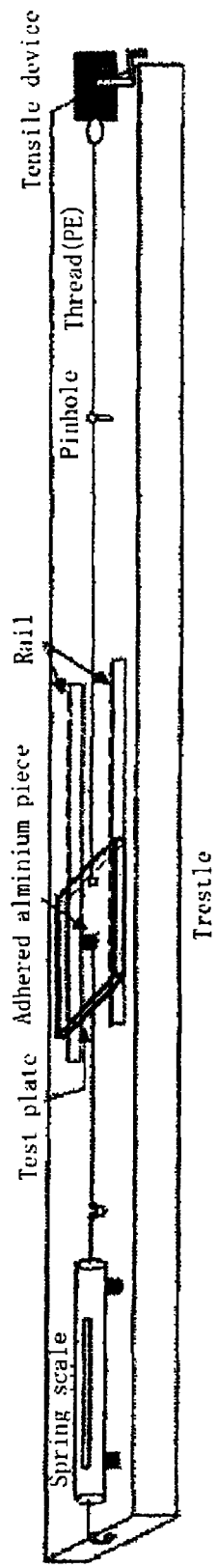
[Fig. 3]

[Fig. 4]
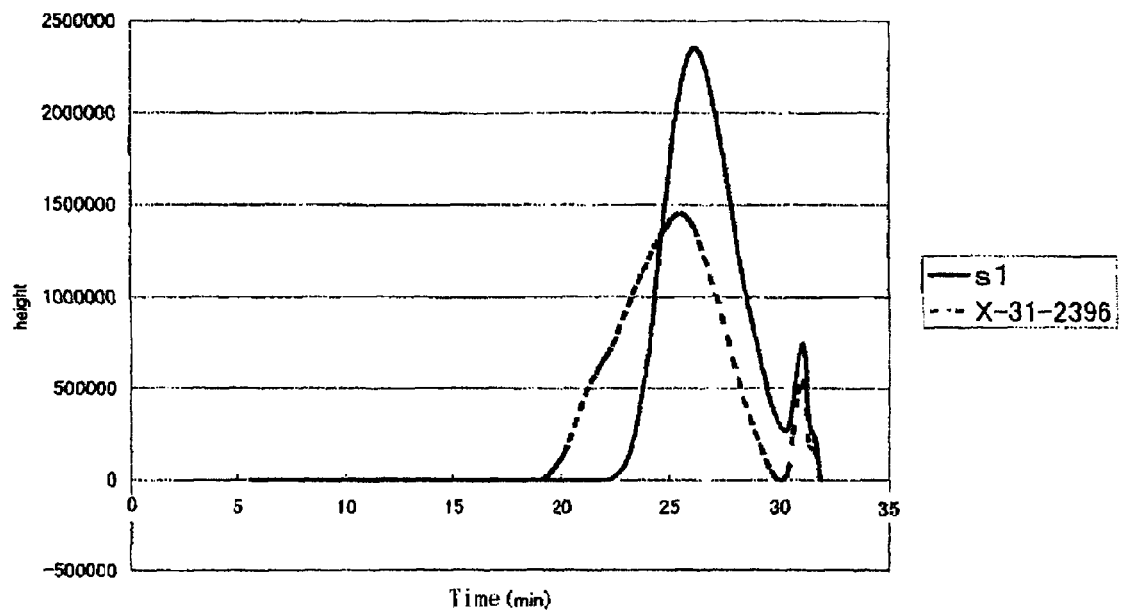
[Fig. 5]
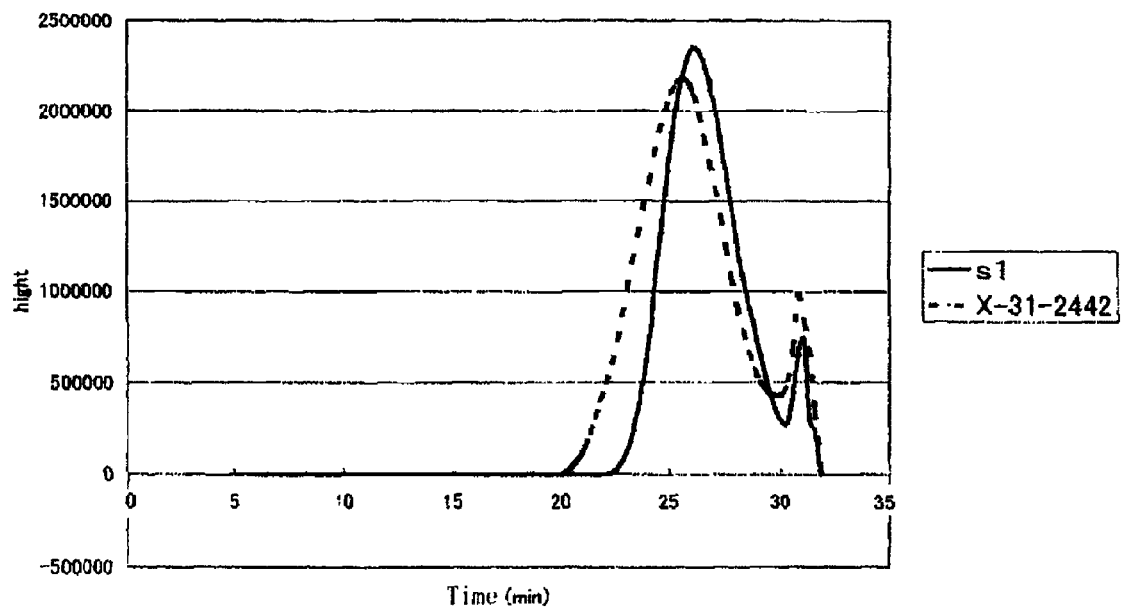

CURABLE COMPOSITION, ANTIFOULING PAINT COMPOSITION, ANTIFOULING COATING FILM, BASE MATERIAL WITH ANTIFOULING COATING FILM AND ANTIFOULING METHOD FOR BASE MATERIAL

TECHNICAL FIELD

The present invention relates to a curable composition, an antifouling paint composition, an antifouling coating film, a base material with an antifouling coating film and an antifouling method for a base material, and more specifically, it relates to a curable composition based on a silicone rubber, an antifouling paint composition, an antifouling coating film, a base material with an antifouling coating film and an antifouling method for a base material.

BACKGROUND ART

Ship outside plates, underwater structures, fishnets and the like are used in water, particularly in seawater over a long period of time, and therefore if many undersea lives such as hydrozoans, Bugula neritina, sea lettuces, green lavers, serpulas, oysters and the like are stuck and grow proliferously on parts brought into contact with seawater, original functions of ships, underwater structures, fishnets and the like are likely to be damaged.

In order to solve such problems as described above, antifouling paints are applied widely on the surfaces of ship outside plates, underwater structures, fishnets, instruments making use of seawater and the like for the purpose of preventing undersea lives from being stuck.

Antifouling paints comprising an organopolysiloxane as a principal component do not contain an antifouling agent such as cuprous oxide and the like and are nontoxic, and therefore they have been widely known.

For example, JP-B 2522854 (patent document 1) discloses curable organopolysiloxane compositions comprising a primary component that comprises (A) an organopolysiloxane in which both ends of a molecular chain are blocked by a silanol group or a hydrolyzable group, (B) an organosilane represented by a formula $R^1{}_a SiX_{4-a}$, wherein $R^1$ represents a non-substituted or substituted monovalent hydrocarbon group having 1 to 8 carbon atoms, X represents a hydrolyzable group and a represents 0 or 1, or a partial hydrolysate thereof and (C) an organopolysiloxane having at least one group represented by a formula $=SiR^2OSiR^3{}_b Y_{3-b}$ in a molecule, wherein $R^2$ represents a non-substituted or substituted divalent hydrocarbon group or a divalent hydrocarbon group having an ether bond, $R^3$ represents a non-substituted or substituted monovalent hydrocarbon group, Y represents a hydrolyzable group and b is 0, 1 or 2, provided that when $R^2$ is the divalent hydrocarbon group having an ether bond, excluded is an organopolysiloxane in which two or more trimethylsiloxy groups are bonded to a Si atom directly linked to a carbon atom of the above hydrocarbon group, and cured products of the composition.

JP-B 63-2995 (patent document 2) discloses nontoxic antifouling paint compositions obtained by mixing a chemical reaction curable silicone rubber, petrolactam or a petrolactam/liquid paraffin mixture and a silicone oil having a low viscosity. JP-A 01-252677 (patent document 3) discloses underwater antifouling coating agents comprising a reaction curable silicone rubber and a specific copolymer as essential components. JP-A 03-255169 (patent document 4) discloses nontoxic antifouling paint compositions comprising a reaction curable silicone resin composition and a silicone resin having an alkoxy group at a molecular end. JP-B 2509674 (patent document 5) discloses nontoxic antifouling paint compositions comprising (a) a reaction curable silicone rubber, (b) a water repellent organic compound and (c) a hydrolyzable silyl group-containing acryl copolymer obtained by reacting a silane compound having a an acetoxy group or a ketoxym group as a hydrolyzable group with a copolymer [I] of (i) a (meth)acrylic alkyl ester with (ii) at least one monomer selected from (meth)acrylic acid and a (meth)acrylic lower hydroxyalkyl ester.

JP-A 2001-139816 (patent document 6) discloses curable compositions comprising an organopolysiloxane having a condensation-reactive functional group at both ends of a molecule and a hydrophobic silica. JP-A 2001-181509 (patent document 7) discloses curable compositions comprising an organopolysiloxane having a condensation-reactive functional group at both ends of a molecule, a hydrophobic silica and a hydrophilic silica.

However, an antifouling property of antifouling coating films obtained from the above antifouling paints is exerted depending to a large extent on components such as silicone oil and like which are released with the passage of time, and therefore when releasing these components finishes, the antifouling property has been lowered to make it difficult to exert the antifouling property over a long period of time.

Patent document 1: JP-B 2522854

Patent document 2: JP-B 63-2995

Patent document 3: JP-A 01-251677

Patent document 4: JP-A 03-255169

Patent document 5: JP-B 2509674

Patent document 6: JP-A 2001-139816

Patent document 7: JP-A 2001-181509

DISCLOSURE OF THE INVENTION

Problem to be Solved by the Invention

The present invention aims to solve the problems involved in the conventional techniques described above. It is an object of the present invention to provide a paint composition and an antifouling paint composition making it possible to form an antifouling coating film which can exert an excellent antifouling performance over a long period of time and particularly can exert an excellent antifouling performance over a long period of time without containing a silicone oil and which makes it easy to remove adhered lives.

Also, an object of the present invention is to provide an antifouling coating film which can exert an excellent antifouling performance over a long period of time and particularly can exert an excellent antifouling performance over a long period of time without containing a silicone oil and which makes it easy to remove adhered lives and to provide a base material, an underwater structure and a ship outside plate which are coated with the above coating film.

Further, an object of the present invention is to provide an antifouling method for a base material which can exert an excellent antifouling performance over a long period of time and particularly can exert an excellent antifouling performance over a long period of time without containing a silicone oil.

Means to Solve the Problem

A curable composition of the present invention is obtained by mixing:
(A) 100 parts by weight of a reaction curable silicone rubber with:
(B) 1 to 100 parts by weight of an organopolysiloxane mixture comprising a product obtained by an R²OH elimination reaction of:
(B1) an organopolysiloxane represented by the following Formula (1):

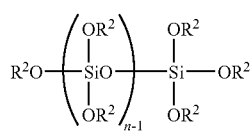  Formula (1)

wherein, in Formula (1), n is an integer of 2 or more and a plurality of R² each is independently a non-substituted or substituted monovalent hydrocarbon group having 1 to 8 carbon atoms, and
(B2) an organopolysiloxane having at least one structure represented by the following Formula (2) in a molecule:

  Formula (2)

wherein, in Formula (2), R³ is a non-substituted or substituted divalent hydrocarbon group or a divalent hydrocarbon group having an ether bond, provided that when R³ in Formula (2) is the divalent hydrocarbon group having an ether bond, excluded is an organopolysiloxane in which two or more trimethylsiloxy groups are bonded to a Si atom directly linked to a carbon atom of R³.

The organopolysiloxane (B2) preferably has a phenyl group.

The curable composition may be obtained by further mixing 0.1 to 200 parts by weight of a silicone oil (C), provided that the reaction curable silicone rubber (A) and the organopolysiloxane mixture (B) comprising the product are excluded from the silicone oil (C), based on total 100 parts by weight of the reaction curable silicone rubber (A) and the organopolysiloxane mixture (B) comprising the product.

The silicone oil (C) is preferably a methylphenyl silicone oil and/or a polyether-modified silicone oil.

The silicone oil (C) is preferably an organopolysiloxane having at least one group represented by the following Formula (3) in a molecule:

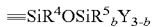  Formula (3)

wherein, in Formula (3), R⁴ is a non-substituted or substituted divalent hydrocarbon group or a divalent hydrocarbon group having an ether bond,
R⁵ is a non-substituted or substituted monovalent hydrocarbon group,
Y is a hydrolyzable group and
b is 0, 1 or 2,
provided that when R⁴ in Formula (3) is the divalent hydrocarbon group having an ether bond, excluded is an organopolysiloxane in which two or more trimethylsiloxy groups are bonded to a Si atom directly linked to a carbon atom of R⁴.

The curable composition may be obtained by further mixing additives selected from the group consisting of a curing catalyst, an antifouling agent and a colorant.

An curable composition of the present invention comprises:
(a) an organopolysiloxane having a hydroxyl group and/or an alkoxyl group and
(b) a product obtained by an R²OH elimination reaction of:
(B1) an organopolysiloxane represented by the following Formula (1):

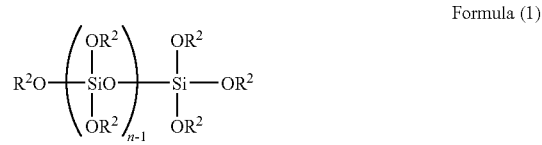  Formula (1)

wherein, in Formula (1), n is an integer of 2 or more, and a plurality of R² each is independently a non-substituted or substituted monovalent hydrocarbon group having 1 to 8 carbon atoms, and
(B2) an organopolysiloxane having at least one structure represented by the following Formula (2) in a molecule:

  (Formula (2))

wherein, in Formula (2), R³ is a non-substituted or substituted divalent hydrocarbon group or a divalent hydrocarbon group having an ether bond, provided that when R³ in Formula (2) is the divalent hydrocarbon group having an ether bond, excluded is an organopolysiloxane in which two or more trimethylsiloxy groups are bonded to a Si atom directly linked to a carbon atom of R³.

An antifouling paint composition of the present invention comprises the curable composition.

An antifouling coating film of the present invention is formed from the antifouling paint composition.

A base material with an antifouling coating film of the present invention is coated with the antifouling coating film.

An underwater structure with an antifouling coating film of the present invention is coated with the antifouling coating film.

A ship outside plate with an antifouling coating film of the present invention is coated with the antifouling coating film.

An antifouling method for a base material of the present invention comprises coating a surface of the base material with the antifouling coating film.

EFFECTS OF THE INVENTION

When the curable composition of the present invention, particularly the antifouling paint composition is used, an antifouling coating film which is excellent in a long-term antifouling property and a water droplet sliding property on a surface and has a surface having a small adhesion, whereby adhered lives are readily removed, can be formed.

The antifouling coating film of the present invention and the base material with the antifouling coating film of the present invention, the underwater structure with the antifouling coating film of the present invention and the ship outside plate with the antifouling coating film of the present invention are excellent in a long-term antifouling property and a water droplet sliding property on a surface and have a surface having a small adhesion, whereby adhered lives are readily removed.

According to the antifouling method of the present invention for a base material, fouling of the base material can be prevented over a long period of time, and lives adhered onto the base material can readily be removed.

BRIEF EXPLANATION OF THE DRAWINGS

FIG. 1 is a drawing showing a sliding angle meter used for measuring a static friction coefficient of the coating film.

FIG. 2 is a drawing showing a sliding angle meter used for measuring a static friction coefficient of the coating film.

FIG. 3 is a drawing showing a peel tester used for measuring an adhesion of the coating film.

FIG. 4 is a GPC chart of a mixture produced in Synthetic Example 1.

FIG. 5 is a GPC chart of a mixture produced in Synthetic Example 2.

BEST MODE FOR CARRYING OUT THE INVENTION

The curable composition, the antifouling paint composition, the antifouling coating film, the base material with the antifouling coating film and the antifouling method for a base material according to the present invention shall be explained below in more details.

Curable Composition:

The curable composition of the present invention is produced by mixing a reaction curable silicone rubber (A) with a organopolysiloxane mixture (B).

<Reaction Curable Silicone Rubber (A)>

The reaction curable silicone rubber (A) comprises an organopolysiloxane (a) having a curing-reactive functional group, an organic group and a siloxane bond as a principal component. Examples of the curing-reactive functional group include a hydroxyl group, an alkoxyl group and a ketoxym group, and examples of the organic group include a methyl group, a phenyl group and a vinyl group. The curing-reactive functional group and the organic group are directly bonded to a Si atom in the organopolysiloxane.

The reaction curable silicone rubber (A) may be a silicone rubber of one-component type or two-component type prepared by blending at least one of multifunctional silane compounds in which a hydrolyzable group (for example, an acetoxy group, a methoxy group, a ketoxym group, an enoxy group, an amide group and the like) is bonded to an organopolysiloxane as a cross-linking agent and at least one of organic metal compounds (for example, naphthenates, octylates, peroxides and organic amines of lead, iron, cobalt, manganese, zinc and the like) as a curing catalyst. The silicone rubber of one-component type which is cured at room temperature or under heating by hydrolysis, dealcoholization, acetic acid elimination, deoximation, hydroxylamine elimination and the like is preferably silicone rubbers cured at ambient temperature from the viewpoint of an easiness in a coating workability. Further, products (for example, silicone rubbers cured by deoximation and silicone rubbers cured by dealcoholization) having less stimulant property of by-products produced in curing are most preferred. In the silicone rubbers of two-component type, the organopolysiloxane (a) is blended preferably with an organic tin compound (for example, dibutyltin dilaurate and the like) as a curing catalyst.

Specific examples of the reaction curable silicone rubber (A) include KE44RTV and KE445RTV (trade names, manufactured by Shin-Etsu Chemical Co., Ltd.) and TSE389 and YF-3057 (trade names, manufactured by Toshiba Silicone Co., Ltd.) as commercial products.

The reaction curable-silicone rubber (A) has a viscosity (25° C., B type rotation viscometer, according to JIS Z 8803) of usually 0.025 to 1,500 Pa·s, preferably 0.025 to 500 Pa·s, more preferably 0.5 to 200 Pa·s and particularly preferably 1 to 100 Pa·s.

<(B) Organopolysiloxane Mixture>

The organopolysiloxane mixture (B) is a mixture of a product obtained by an $R^2OH$ elimination reaction of:

(B1) an organopolysiloxane represented by the following formula (1):

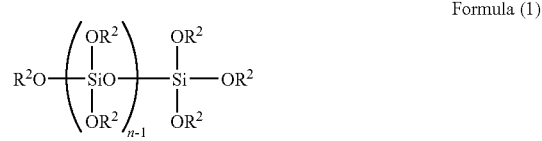

Formula (1)

and (B2) an organopolysiloxane having at least one structure represented by the following Formula (2) in a molecule:

$\equiv SiR^3OH$            Formula (2)

and an unreacted organopolysiloxane (B1).

(B1) Organopolysiloxane:

The organopolysiloxane (B1) has a dynamic viscosity (Ostwald viscometer, according to JIS Z 8803) of usually $2 \times 10^{-6}$ to $90 \times 10^{-6}$ m²/s, preferably $3 \times 10^{-6}$ to $7 \times 10^{-6}$ m²/s at 25° C.

In Formula (1), n is an integer of 2 or more, preferably 4 to 6 and is selected so that the viscosity of the organopolysiloxane (B1) falls in the range described above.

In Formula (1), a plurality of $R^2$ each is independently a non-substituted or substituted monovalent hydrocarbon group having 1 to 8 carbon atoms.

$R^2$ is usually a non-substituted or substituted monovalent hydrocarbon group having 1 to 8 carbon atoms, and specific examples thereof include alkyl groups such as methyl, ethyl, propyl and butyl;

alkenyl groups such as vinyl and allyl;

aryl groups such as phenyl and tolyl; cycloalkyl groups such as cyclohexyl;

aralkyl groups such as benzyl and 2-phenylethylyl; and groups obtained by substituting a part or all of hydrogen atoms contained in the above groups with a halogen atom, a cyano group or the like (for example, chloromethyl, 3,3,3-trifluoropropyl and 2-cyanoethyl). From the viewpoint of an easiness in synthesis, methyl and ethyl are preferred, and methyl is particularly preferred.

Specific examples of the organopolysiloxane (B1) include methyl silicate 51, ethyl silicate 40, ethyl silicate 45, ethyl silicate 48, propyl silicate and butyl silicate. From the viewpoint of an easiness in synthesis, methyl silicate 51 and ethyl silicate 40 are preferred, and methyl silicate 51 is particularly preferred.

(B2) Organopolysiloxane:

The organopolysiloxane (B2) is an organopolysiloxane having at least one structure represented by the following Formula (2) in a molecule:

$\equiv SiR^3OH$            Formula (2)

provided that when $R^3$ in Formula (2) is a divalent hydrocarbon group having an ether bond, excluded is an organopolysiloxane in which two or more trimethylsiloxy groups are bonded to a Si atom directly linked to a carbon atom of $R^3$.

In Formula (2), $R^3$ is a non-substituted or substituted divalent hydrocarbon group or a divalent hydrocarbon group having an ether bond (a group represented by "—$(CH_2)_p$—O—$(CH_2)_q$—", wherein p and q each are independently an integer of 1 to 6).

Specific examples of $R^3$ include methylene, ethylene, propylene, butylene, hexamethylene and propyloxyethyene.

From the viewpoint of a compatibility of the reaction curable silicone rubber (A) with the organopolysiloxane mixture (B), ethylene, propylene and propyloxyethyene are preferred, and propyloxyethyene is particularly preferred.

The organopolysiloxane (B2) has a dynamic viscosity (Ostwald viscometer, according to JIS Z 8803) of usually $5 \times 10^{-6}$ to $1000 \times 10^{-6}$ m$^2$/s, preferably $30 \times 10^{-6}$ to $300 \times 10^{-6}$ m$^2$/s at 25° C.

The organopolysiloxane (B2) preferably has a phenyl group because of a reason described later.

Specific examples of the organopolysiloxane (B2) include compounds represented by the following Formulae (4) to (7):

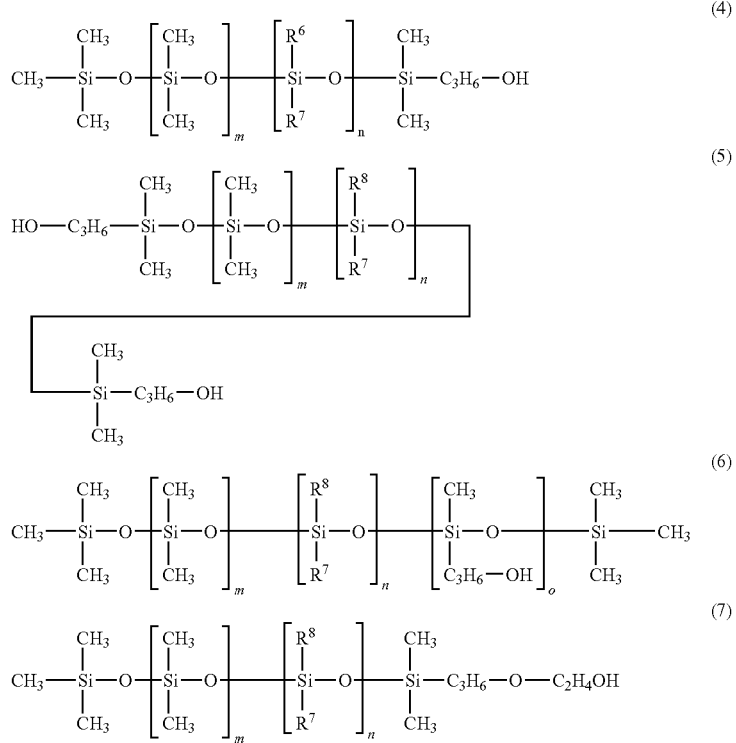

wherein, in the respective formulae, $R^7$ and $R^8$ are a non-substituted or substituted monovalent hydrocarbon group, and at least one of $R^7$ and $R^8$ is a non-substituted or substituted monovalent hydrocarbon group selected from groups other than methyl, including aryl groups such as phenyl and tolyl, aralkyl groups such as benzyl and β-phenylethyl, and halogenated alkyl groups such as trifluoropropyl; and m, n and l are natural numbers. From the viewpoint of the antifouling property, the compounds represented by Formulae (4) and (7) are preferred, and the compound represented by Formula (7) is particularly preferred.

(B) Organopolysiloxane Mixture:

The organopolysiloxane mixture (B) is a mixture of a product obtained by an R$^2$OH elimination reaction of the organopolysiloxane (B1) (hereinafter also referred to as "component (B1)") and the organopolysiloxane (B2) (hereinafter also referred to as "component (B2)") and the unreacted organopolysiloxane (B1). The R$^2$OH is produced by reaction of an OR$^2$ group in Formula (1) and an OH group in Formula (2).

A combination of the organopolysiloxane (B1) and the organopolysiloxane (B2) is preferably, from the viewpoint of a compatibility of the organopolysiloxane (B1) with the organopolysiloxane (B2), a combination of methyl silicate 51 and the compound represented by Formula (4), a combination of methyl silicate 51 and the compound represented by Formula (7), a combination of ethyl silicate 40 and the compound represented by Formula (4) and a combination of ethyl silicate 40 and the compound represented by Formula (7), and is particularly preferably a combination of methyl silicate 51 and the compound represented by Formula (7).

The organopolysiloxane mixture (B) can be obtained by using the organopolysiloxane (B2) in a range of 0.5 to 6 mole, preferably 1 to 3 mole based on 1 mole of the organopolysiloxane (B1) to subject them to condensation reaction (dealcoholization reaction). When a use amount of the organopolysiloxane (B2) is less than 0.5 mole, a surface of a coating film obtained from the curable composition is inferior in a water droplet sliding property in a certain case, and when it exceeds 6 mole, a preferred viscosity of the organopolysiloxane mixture (B) is not obtained in a certain case.

The organopolysiloxane mixture (B) contains a condensation product of the component (B1) and the component (B2) and the residual component (B1) and component (B2) in a proportion of, for example, the condensation product: the component (B1): the component (B2)=80 to 90:10 to 20:0 (weight ratio, the total is 100 parts by weight).

In a condensation reaction of the component (B1) and the component (B2), a condensation reaction catalyst is preferably used. Examples of the condensation reaction catalyst include:

tin carboxylates such as tin octylate, tin naphthenate and tin oleate;

tin compounds such as dibutyltin diacetate, dibutyltin dioctoate, dibutyltin dilaurate, dibutyltin dioleate, dibutyltin oxide, dibutyltin dimethoxide and dibutylbis(triethoxysiloxy)tin;

titanic esters and titanium chelate compounds such as tetraisopropoxytitanium, tetra-n-butoxytitanium, tetrakis(2-ethylhexoxy)titanium, dipropoxybis(acetylacetonate)titanium and titanium isopropoxyoctyl glycol;

organic metal compounds such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds;

aminoalkyl group-substituted alkoxysilanes such as 3-aminopropyltrimethoxysilane and N-β (aminoethyl)-γ-aminopropyltrimethoxysilane; and amines such as hexylamine, dodecyldodecylamine phosphate, dimethylhydroxylamine and diethylhydroxylamine. A use amount of the condensation reaction catalyst is not specifically limited as long as it is an effective amount as the catalyst, and it is usually 0.01 to 5 parts by weight based on total 100 parts by weight of the component (B1) and the component (B2).

The condensation reaction temperature is not specifically limited, and it falls in a range of usually 1 to 120° C., preferably 15 to 80° C. The reaction time is not specifically limited as well, and it is usually 10 minutes to 72 hours, preferably 1 to 48 hours.

Specific examples of the organopolysiloxane mixture (B) include X-31-2396 and X-31-2442 (trade names, manufactured by Shin-Etsu Chemical Co., Ltd.).

The organopolysiloxane mixture (B) has a viscosity (25° C., B type rotation viscometer, according to JIS Z 8803) of usually 3 to 1,000 mPa·s, preferably 20 to 300 mPa·s and more preferably 25 to 250 mPa·s.

The curable composition of the present invention is produced by mixing 100 parts by weight of the reaction-curable silicone rubber (A) with 1 to 100 parts by weight, preferably 5 to 60 parts by weight and more preferably 10 to 45 parts by weight of the organopolysiloxane mixture (B).

<Other Components>

The curable composition of the present invention may contain other components such as a silicone oil (C), a curing catalyst, an antifouling agent and a colorant. These components shall be explained below.

<Silicone Oil (C)>

The curable composition of the present invention is capable of forming an antifouling coating film having an excellent long-term antifouling property even if it does not contain a silicone oil, but the curable composition of the present invention may contain the silicone oil (C). The silicone oil (C) is not specifically limited as long as it is a non-reactive (non-condensing) silicone oil or a silicone oil bleeding out from the coating film of the present invention. From the viewpoint of a compatibility of the reaction curable silicone rubber (A) and the organopolysiloxane mixture (B) with the silicone oil (C), the silicone oil (C) is preferably a methylphenylsilicone oil, a polyether-modified silicone oil and a silicone oil having a group represented by the following Formula (3) (hereinafter also referred to as "silicone oil (3)"):

  Formula (3)

wherein, in Formula (3), $R^4$ is a non-substituted or substituted divalent hydrocarbon group or a divalent hydrocarbon group having an ether bond;

$R^5$ is a non-substituted or substituted monovalent hydrocarbon group;

Y is a hydrolyzable group; and b is 0, 1 or 2.

It is thought that, among the silicone oils (C), the methylphenylsilicone oil and the polyether-modified silicone oil bleed out on the surface of the coating film with the passage of time to be gradually released into seawater. It is thought that the silicone oil having a group represented by Formula (3) reacts with the component (A) and the like, which are coating film forming components, to form a cured coating film, and when the coating film is dipped in seawater over a long period of time, the silicone oil is hydrolyzed with the passage of time to allow a terminal group to be turned into a group having an alcoholic hydroxyl group (=SiR⁴OH) and bleeds out on the surface of the coating film, whereby adhesion of an undersea life is prevented.

Specific examples of the methylphenylsilicone oil include KF-50-100 and KF-50-300 (manufactured by Shin-Etsu Chemical Co., Ltd.) and TSF431 (manufactured by Toshiba Silicone Co., Ltd.). Specific examples of the polyether-modified silicone oil include KF-6011 (manufactured by Shin-Etsu Chemical Co., Ltd.) and TSF4730 (manufactured by Toshiba Silicone Co., Ltd.).

The silicone oil (3) having a group represented by the following Formula (3) may be a silicone oil proposed by the present applicant and the like which is described in JP-B 2522854:

  Formula (3)

wherein, in Formula (3), $R^4$ is a non-substituted or substituted divalent hydrocarbon group or a divalent hydrocarbon group having an ether bond;

$R^5$ is a non-substituted or substituted monovalent hydrocarbon group;

Y is a hydrolyzable group; and b is 0, 1 or 2.

The silicone oil (3) preferably has a number average molecular weight of 250 to 20,000, preferably 1,000 to 10,000 and a dynamic viscosity (25° C., Ostwald viscometer, according to JIS Z 8803) of usually $20\times10^{-6}$ to $30,000\times10^{-6}$ m²/s, preferably $50\times10^{-6}$ to $3,000\times10^{-6}$ m²/s.

Specific examples of $R^4$ in Formula (3) include a non-substituted or substituted divalent hydrocarbon group such as methylene, ethylene, propylene, butylene and hexamethylene; and a divalent hydrocarbon group having an ether bond represented by "—$(CH_2)_p$—O—$(CH_2)_q$—", wherein p and q each are independently an integer of 1 to 6.

$R^5$ includes the same groups as the groups given as the specific examples of $R^2$ in Formula (1) and is usually a non-substituted or substituted monovalent hydrocarbon group having 1 to 8 carbon atoms. Specific examples thereof include alkyl groups such as methyl, ethyl, propyl and butyl;

alkenyl groups such as vinyl and allyl;

aryl groups such as phenyl and tolyl;

cycloalkyl groups such as cyclohexyl;

aralkyl groups such as benzyl and 2-phenylethylyl; and groups obtained by substituting a part or all of hydrogen atoms contained in the above groups with a halogen atom, a cyano group or the like (for example, chloromethyl, 3,3,3-trifluoropropyl and 2-cyanoethyl).

Y is a hydrolyzable group, and specific examples of Y include alkoxy groups such as methoxy, ethoxy, propoxy, butoxy, methoxyethoxy and ethoxyethoxy;

acyloxy groups such as acetoxy, propionoxy, butyloxy and benzoyloxy;

alkenyloxy groups such as isopropenyloxy, isobutenyloxy and 1-ethyl-2-methylvinyloxy;

iminoxime groups such as dimethylketoxime, methylethylketoxime, diethylketoxime, cyclopentanoxime and cyclohexanoxime;

amino groups such as N-methylamino, N-ethylamino, N-propylamino, N-butylamino, N,N-dimethylamino, N,N-diethylamino and cyclohexylamino;

amide groups such as N-methylacetamide, N-ethylacetamide and N-methylbenzamide; and aminoxy groups such as N,N-dimethylaminoxy and N,N-diethylaminoxy.

Specific examples of the silicone oil (3) include compounds described in JP-B 2522854:

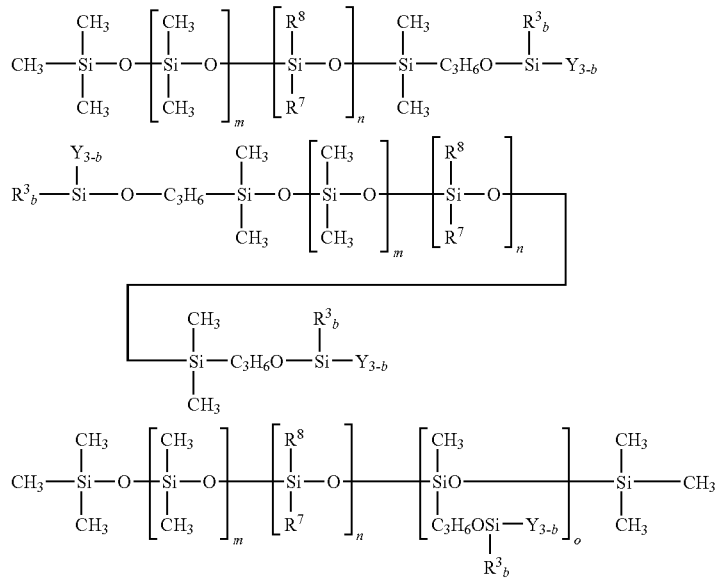

wherein $R^3$ is a non-substituted or substituted monovalent hydrocarbon group, and $R^7$, $R^8$, Y, b, l, m and n are the same as described above.

Examples of an organopolysiloxane having an alcoholic hydroxyl group represented by $\equiv SiR^4OH$ include the compound represented by Formula (4), (5) or (6) described in JP-B 2522854. The silicone oil (3) can be produced by a process described in JP-B 2522854.

The silicone oil (C) is blended in an amount of preferably 0.1 to 200 parts by weight, more preferably 5 to 100 parts by weight and further preferably 10 to 100 parts by weight based on total 100 parts by weight of the reaction curable silicone rubber (A) and the organopolysiloxane mixture (B).

If the blending amount of the silicone oil (C) falls in the range described above, an antifouling coating film which is excellent in both of an antifouling property and a coating film strength is obtained when the curable paint composition of the present invention is used, for example, as an antifouling paint. On the other hand, if the blending amount of the silicone oil (C) is smaller than the range described above, an antifouling property of the antifouling coating film is reduced in a certain case, and if it exceeds the range described above, a strength of the antifouling coating film is reduced in a certain case.

<Curing Catalyst>

Compounds described in JP-B 2522854 can suitably be used as the curing catalyst, and to be specific, they include tin carboxylates such as tin octylate, tin naphthenate and tin oleate;

tin compounds such as dibutyltin diacetate, dibutyltin dioctoate, dibutyltin dilaurate, dibutyltin dioleate, dibutyltin oxide, dibutyltin dimethoxide and dibutylbis(triethoxysiloxy)tin;

titanic esters and titanium chelate compounds such as tetraisopropoxytitanium, tetra-n-butoxytitanium, tetrakis(2-ethylhexoxy)titanium, dipropoxybis(acetylacetonate)titanium and titanium isopropoxyoctyl glycol;

organic metal compounds such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds;

aminoalkyl group-substituted alkoxysilanes such as 3-aminopropyltrimethoxysilane and N-β (aminoethyl)-γ-aminopropyltrimethoxysilane;

amine compounds and salts thereof such as hexylamine, dodecyldodecylamine phosphate, dimethylhydroxylamine and diethylhydroxylamine;

quaternary ammonium salts such as benzyltriethylammonium acetate;

lower fatty acid salts of alkali metals such as potassium acetate, sodium acetate and lithium oxalate; and silanes or siloxanes having a guanidyl group such as tetramethylguanidylpropyltrimethoxysilane, tetramethylguanidylpropylmethyldimethoxysilane and tetramethylguanidylpropyltris(trimethylsiloxy)silane.

The curing catalysts are used in an amount of 10 parts by weight or less, preferably 5 parts by weight or less and more preferably 1 part by weight or less based on 100 parts by weight of the component (A). A preferred lower limit thereof in using is 0.001 part by weight or more, particularly 0.01 part by weight or more.

<Antifouling Agent>

The antifouling agent may be either inorganic or organic.

Compounds which are conventionally known can be used as the inorganic antifouling agent, and among them, copper and inorganic copper compounds are preferred.

Examples of the organic antifouling agent include metal pyrithiones represented by the following Formula (vi), tetramethylthiuram disulfide, carbamate compounds such as zinc dimethyldithiocarbamate and manganese 2-ethylenebisdithiocarbamate, 2,4,5,6-tetrachloroisophthalonitrile, N,N-dimethyldichlorophenylurea, 4,5-dichloro-2-n-octyl-3(2H) isothiazoline, 2,4,6-trichlorophenylmaleimide and 2-methylthio-4-t-butylamino-6-cyclopropyl-s-triazine;

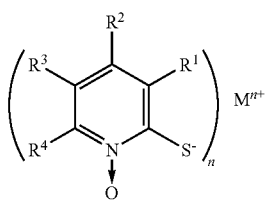

(vi)

wherein $R^1$ to $R^4$ each represent independently hydrogen, an alkyl group, an alkoxy group or a halogenated alkyl group; M represents metal such as Cu, Zn, Na, Mg, Ca, Ba, Pb, Fe and Al; and n represents a valence.

Among the organic antifouling agents, preferred are copper pyrithione (in Formula (vi), M=Cu), zinc pyrithione (in Formula (vi), M=Zn), N,N-dimethyldichlorophenylurea, 2,4,6-trichlorophenylmaleimide, 2-methylthio-4-t-butylamino-6-cyclopropyl-s-triazine, 4,5-dichloro-2-n-octyl-4-isothiazoline-3-one and 2,4,5,6-tetrachloroisophthalonitrile.

Among the organic antifouling agents, metal pyrithiones and/or 4,5-dichloro-2-n-octyl-4-isothiazoline-3-one are preferred, and combined use thereof is preferred since the antifouling performance is excellent. In particular, copper pyrithione and/or 4,5-dichloro-2-n-octyl-4-isothiazoline-3-one are preferably used, and combined use thereof is more preferred.

In the antifouling paint composition containing the organic antifouling agent, the organic antifouling agent is contained preferably in an amount of usually 0.1 to 20% by weight, preferably 0.5 to 10% by weight. Further, the above organic antifouling agent is contained preferably in an amount of usually 0.1 to 150 parts by weight, preferably 0.1 to 100 parts by weight as the solid content based on 100 parts by weight of the solid content of the reaction curable silicone rubber (A).

<Plasticizer (Chlorinated Paraffin)>

Examples of a plasticizer include TCP (tricresyl phosphate), chlorinated paraffins and polyvinyl ethyl ether. The plasticizers can be used alone or in combination of two or more kinds thereof. The plasticizers contribute to an improvement in a clutch resistance of the coating film (also referred to as "antifouling coating film") comprising the antifouling paint composition.

<Inorganic Dehydrating Agent>

An inorganic dehydrating agent functions also as a stabilizing agent and can further enhance a storage stability of the antifouling paint composition. Examples of the inorganic dehydrating agent include anhydrous gypsum ($CaSO_4$), synthetic zeolite adsorbents (trade name: Molecular Sieves and the like) and silicates, and anhydrous gypsum and Molecular Sieves are preferably used. The inorganic dehydrating agents can be used alone or in combination of two or more kinds thereof.

In the curable composition containing the inorganic dehydrating agent, the inorganic dehydrating agent may be contained in the curable composition of the present invention in an amount of usually about 0.1 to 10% by weight, preferably about 0.1 to 5% by weight.

<Metal Carboxylate>

The curable composition of the present invention may further contain a metal carboxylate.

The metal carboxylate having a molecular weight of usually 50 to 1000, preferably 100 to 600 are used. Carboxylic acid constituting the metal carboxylate is preferably carboxylic acids having an alicyclic structure such as naphthenic acid, carboxylic acids having an aromatic ring structure such as α-(2-carboxyphenoxy)stearic acid, rosin-based resin acids, fatty acids and the like, and naphthenic acid, rosin-based resin acids and fatty acids are preferred.

<Anti-Sagging Agent/Anti-Settling Agent (Thixotropic Agent)>

Examples of an anti-sagging agent/anti-settling agent (thixotropic agent) include salts (for example, stearates, lecithin salts and alkylsulfonates) of Al, Ca or Zn derived from an organic clay, hydrogenated castor oil wax, polyamide wax, a mixture of both waxes, polyethylene wax, amide wax, synthetic fine powder silica and polyethylene oxide wax. Polyamide wax, synthetic fine powder silica, polyethylene oxide wax and those derived from an organic clay are preferably used. Examples of the anti-sagging agent/anti-settling agent include commercial products under the trade names "Dispalon A630-20X" in addition to "Dispalon 305" and "Dispalon 4200-20" manufactured by Kusumoto Chemicals, Ltd.

The anti-sagging agent/anti-settling agent is blended in the curable composition in an amount of, for example, 0.1 to 10% by weight.

<Colorant>

Various organic and inorganic pigments which are conventionally known can be used as the colorant. The organic pigments include carbon black, phthalocyanine blue, Prussian blue and the like. The inorganic pigments include, for example, pigments, which are neutral and non-reactive, such as titan white, red iron oxide, baryte powder, silica, calcium carbonate, talc, chalk and iron oxide powder; and pigments (active pigments), which are basic and reactive with an acid substance in a paint, such as zinc flower (ZnO, zinc oxide), lead white, red lead oxide, zinc dust and lead suboxide powder. Various colorants such as dyes may be contained therein. The various pigments are blended in the paint composition in an amount of, for example, 0.5 to 45% by weight in total.

<Other Coating Film-Forming Component>

Coating film-forming components other than the reaction curable silicone rubber (A) and the like may be contained as long as they do not act counter to the objects of the present invention. Examples of the "other coating film-forming component" include poorly water-soluble or non-water-soluble resins (hereinafter also referred to as "poorly/non-water-soluble resins") such as acrylic resins, acryl silicone resins, unsaturated polyester resins, fluororesins, polybutene resins, silicone rubbers, urethane resins (rubbers), polyamide resins, vinyl chloride copolymer resins, chlorinated rubbers (resins), chlorinated olefin resins, styrene-butadiene copolymer resins, ethylene-vinyl acetate copolymer resins, vinyl chloride resins, alkyd resins, coumarone resins, trialkylsilyl acrylate (co)polymers (silyl resins) and petroleum resins.

<Other Fillers, Flame Retardants, Thixotropy-Providing Agents, Heat Conductivity-Improving Agents, Adhesive Components and the Like>

Fillers other than the compounds described above include metal oxides such as diatomaceous earth, iron oxide, zinc oxide, titanium oxide and alumina and compounds obtained by subjecting these compounds to surface treatment with silane compounds; metal carbonates such as calcium carbonate, magnesium carbonate and zinc carbonate; asbestos, glass fibers, carbon blacks, quartz powder, aluminum hydroxide, gold powder, silver powder, surface-treated calcium carbonate and glass balloon. The above fillers may be used alone or in combination of two or more kinds thereof.

The thixotropy-providing agent includes polyethylene glycol, polypropylene glycol, derivatives thereof and the like. The flame retardant includes antimony oxide, paraffin oxide and the like. The heat conductivity-improving agent includes boron nitride, aluminum oxide and the like. The adhesive component includes substances having at least one of groups such as alkoxysilyl group, an epoxy group, a hydrosilyl group, an acryl group, a hydroxysilyl group and the like and mixtures of the substances.

<Solvents>

The curable composition of the present invention may or may not contain a solvent. The components described above dissolved or dispersed in the solvent can be used, if necessary. Examples of the solvent used include solvents which are blended usually with antifouling paints, such as aliphatic solvents, aromatic solvents, ketone solvents, ester solvents, ether solvents and alcohol solvents. The aromatic solvents include xylene, toluene and the like; the ketone solvents include MIBK, cyclohexanone and the like; the ether solvents include propylene glycol monomethyl ether, propylene glycol monomethyl ether acetate (PMAC) and the like; and the alcohol solvents include isopropyl alcohol and the like.

The solvent can be used in an arbitrary amount and is used in an amount of, for example, 0.1 to 9999 parts by weight, preferably 1 to 50 parts by weight based on 100 parts by weight of the reaction curable silicone rubber (A). Further, the solvent is used in such an amount that usually 1 to 99% by weight, preferably 5 to 50% by weight in the curable composition of the present invention. The curable composition which is optionally diluted by the solvent has a viscosity (25° C., B type viscometer, No. 3 rotor) of, for example, about 0.001 to 50 Pa·s/25° C., preferably about 0.01 to 20 Pa·s/25° C. considering a coating property (sagging property) and a film thickness obtained by coating once.

Production of the Curable Composition:

The curable composition of the present invention can be prepared by stirring and mixing the reaction curable silicone rubber (A) and the organopolysiloxane mixture (B) and, if necessary, the silicone oil (C), the curing catalyst, the antifouling agent, the thixotropy-providing agent, the plasticizer, the inorganic dehydrating agent (stabilizing agent), the anti-sagging agent/anti-settling agent (thickening agent), the colorant, the dye, the other coating film-forming component, the solvent (example: xylene), a fungicide, a mildewcide, an anti-aging agent, an antioxidant, an antistatic agent, the flame retardant, the heat conductivity-improving agent, an adhesion-providing agent and the like in prescribed proportions at one time or in an arbitrary order.

In stirring and mixing the respective components, mixing or stirring devices which are conventionally known such as a loss mixer, a planetary mixer and a Shinagawa mixer can be used.

The reaction curable silicone rubber (A) is a moisture-curable type, and therefore the curable composition of the present invention is produced preferably under controlling temperature and humidity avoiding high temperature and high humidity.

Antifouling Coating Film, a Base Material with an Antifouling Coating Film and an Antifouling Method:

The antifouling coating film of the present invention is formed from the antifouling paint composition comprising the curable composition of the present invention.

The organopolysiloxane mixture (B) and a hydrolyzable group contained in the reaction curable silicone rubber (A) (each of the reaction product of the organopolysiloxane (B1) and the organopolysiloxane (B2) and the unreacted organopolysiloxane (B1) and a hydrolyzable group contained in the reaction curable silicone rubber (A)) are subjected to a cross-linking reaction to form the antifouling coating film of the present invention to which undersea lives are less liable to adhere or from which, if they adhered to, they are readily removed and whose surface can be maintained in smooth over a long period of time, whereby the antifouling coating film of the present invention exerts an antifouling performance over a long period of time.

As described above, the organopolysiloxane (B2) preferably has a phenyl group. The organopolysiloxane (B2) having a phenyl group is inferior in a compatibility with the reaction curable silicone rubber (A). Accordingly, it is estimated that if a phenyl group is present on at least a part of the side chain, a part derived from the reaction curable silicone rubber (A) is separated from a part derived from the organopolysiloxane (B2) in the coating film. It is also estimated from the finger touch of the coating film that the separation is caused in an order of a part derived from the organopolysiloxane (B2)/a part derived from the reaction curable silicone rubber (A)/the base material (a two-layer separation structure is formed). It is considered that the antifouling coating film of the present is further improved in an antifouling performance by the two-layer separation structure.

Further, when the silicone oil (C) is used, the silicone oil (C) bleeds out on the surface of the coating film, and the antifouling action is continued over a long period of time.

In the base material with the antifouling coating film, the underwater structure with the antifouling coating film and the ship outside plate with the antifouling coating film (hereinafter also collectively referred to as "base material and the like with the antifouling coating film") of the present invention, the surfaces of the base material, the underwater structure and the ship outside plate (hereinafter collectively referred to as "base material and the like") are coated respectively with the antifouling coating film of the present invention.

In the base material and the like with the antifouling coating film according to the present invention, the surface of the base material which is brought into contact with seawater or fresh water is coated with the antifouling coating film of the present invention.

The base material includes a fishnet, a fishing equipment, an existing antifouling coating film and the like in addition to the underwater structure and the ship outside plate.

The method for forming the coating film on the surface of the base material of the present invention is characterized by coating or impregnating the surface of the base material with the high solid antifouling paint composition and then curing it to form a coating film.

The antifouling method for a base material of the present invention is characterized by coating the surface of the base material with the antifouling coating film of the present invention.

A method for coating the surface of the base material with the antifouling coating film of the present invention includes, to be specific, a method comprising coating or impregnating the surface of the base material with the antifouling paint composition of the present invention and then curing the antifouling paint composition to form an antifouling coating film.

In the present invention, the base material which is an object of the antifouling method is preferably any of an underwater structure, a ship outside plate, a fishnet and a fishing equipment.

To explain in detail, the antifouling paint composition of the present invention is applied once to plural times according to an ordinary method to the surfaces of various products including ship outside plates, underwater structures such as feed-water inlets and drain outlets in thermal and atomic power stations, sludge diffusion preventing films for various ocean civil engineering works such as coastal roads, submarine tunnels, port facilities, canals and water channels and fishery materials such as ropes, fishnets, fishing equipments, floaters and buoys, whereby obtained are ship outside plates, underwater structures and the like each coated with an antifouling coating film having excellent antifouling properties, particularly a long-term antifouling property and, even if the composition is applied thickly, a suitable flexibility and an excellent crack resistance.

That is, the antifouling coating film obtained by applying the antifouling paint composition of the present invention on the surfaces of various products and curing it is excellent in such an antifouling property that it can continuously prevent adhesion of aquatic lives such as sea lettuces, barnacles, green lavers, serpulas, oysters and Bugula neritina over a long period of time.

Further, if the antifouling paint composition of the present invention is applied to the surfaces of underwater structures, adhesion of undersea lives can be prevented to make it possible to maintain the functions of the underwater structures over a long period of time. If the antifouling paint composition of the present invention is applied to the surfaces of fishnets, clogging of the networks of the fishnets can be prevented. In addition thereto, the environment is less likely to be polluted.

The antifouling paint composition of the present invention may be directly applied to fishnets and may be applied to surfaces of ships or underwater structures coated in advance with an undercoating material such as a rust preventive and a primer. Further, the high solid antifouling paint composition of the present invention may be applied for repairs to the surfaces of ships, particularly FRP ships, and underwater structures which have already been coated with conventional antifouling paints or the high solid antifouling paint composition of the present invention. The thickness of the antifouling coating film thus formed on the surfaces of ships, underwater structures and the like is not specifically limited, and is, for example, about 30 to 250 μm/time.

The antifouling coating film of the present invention which is obtained in the manner or the coating film on the surfaces of water-contacting parts of ships and underwater structures is formed from the antifouling paint composition of the present invention, is less likely to bring about environmental pollution and shows an excellent long-term antifouling property against a wide range of lives adhered onto ships and underwater structures.

EXAMPLES

The present invention shall more specifically be explained below with reference to examples which are the preferred embodiments, but the present invention shall by no means be limited by these examples.

X-31-2396 (trade name) and X-31-2442 (trade name) manufactured by Shin-Etsu Chemical Co., Ltd. were used as the organopolysiloxane mixture (B). These organopolysiloxane mixtures (B) were synthesized according to the following procedure.

Synthetic Example 1

Synthesis of X-31-2396:

132 g of an organopolysiloxane having an alcoholic hydroxyl group which is represented by:

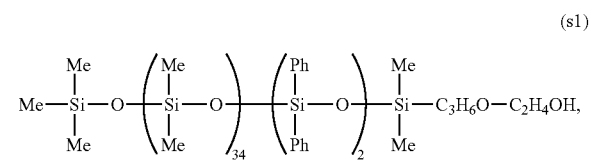

(s1)

19 g of a silicate compound represented by:

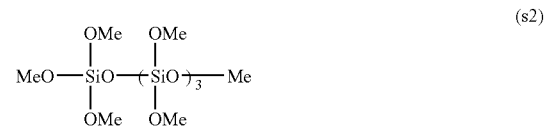

(s2)

and 0.1 g of tin octylate were mixed under heating at 60° C. and reacted for 24 hours to obtain a mixture of a reaction product of the organopolysiloxane represented by (s1) and the silicate compound represented by (s2) and the silicate compound represented by:

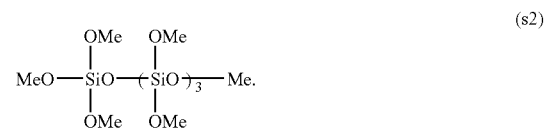

(s2)

Production of the above mixture was confirmed by measuring a molecular weight distribution by GPC. The GPC chart is shown in FIG. 4. The following compounds and the like:

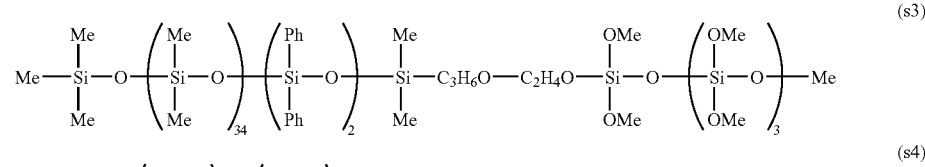

(s3)

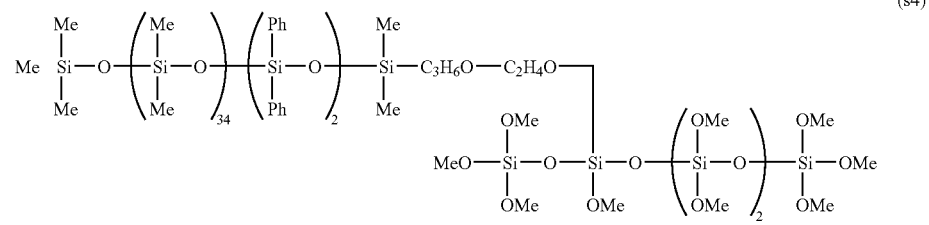

(s4)

are considered to be contained in the reaction product.

Synthetic Example 2

Synthesis of X-31-2442:

132 g of organopolysiloxane having an alcoholic hydroxyl group which is represented by:

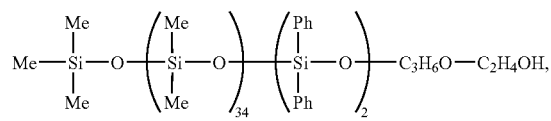
(s5)

35 g of a silicate compound represented by:

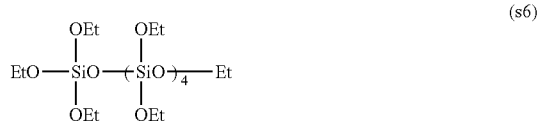
(s6)

and 0.1 g of tin octylate were mixed under heating at 90° C. and reacted for 24 hours to obtain a mixture of a reaction product of the organopolysiloxane represented by (s5) and the silicate compound represented by (s6) and the silicate compound represented by:

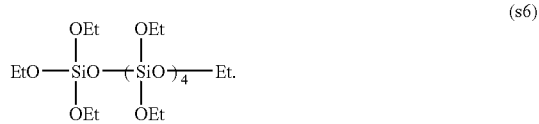
(s6)

Production of the above mixture was confirmed by measuring a molecular weight distribution by GPC. The GPC chart is shown in FIG. 5. The following compounds and the like:

are considered to be contained in the reaction product.

<Production of Curable Composition>

Example 1

50 parts by weight of KE44RTV (one-component RTV silicone rubber, manufactured by Shin-Etsu Chemical Co., Ltd., viscosity: 70 Pa·s) as the reaction curable silicone rubber (A), 15 parts by weight of the mixture (X-31-2396) produced in Synthetic Example 1 as the organopolysiloxane mixture (B) and 35 parts by weight of xylene were mixed and stirred for 10 minutes to produce a curable composition.

Example 7

A primary agent and a curing agent component each shown below were sufficiently mixed to produce a two-component type curable composition.

<Primary Agent>

70 parts by weight of YF-3057 (two-component RTV silicone rubber: principal agent, manufactured by Toshiba Silicone Co., Ltd.) as the reaction curable silicone rubber (A)

<Curing Agent>

15 parts by weight of the mixture (X-31-2396: curing agent) produced in Synthetic Example 1 as the organopolysiloxane mixture (B), 0.7 part by weight NEOSTAN U-100 (dibutyltin dilaurate, manufactured by Nitto Kasei Co., Ltd.) as a curing catalyst and 14.3 parts by weight xylene, which were components other than the reaction curable silicone rubber (A), were mixed and stirred for 10 minutes to prepare a curable agent.

Examples 2 to 6 and Comparative Examples 1 to 5

Curable compositions were produced by the same method as in Example 1, except that the blend components and the blend amounts were changed as shown in Table 1.

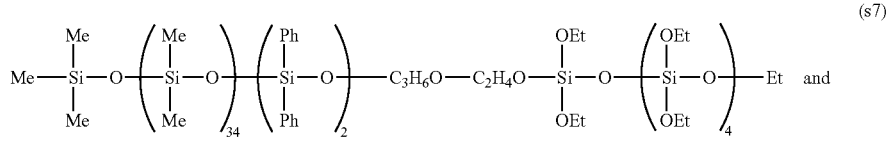
(s7)

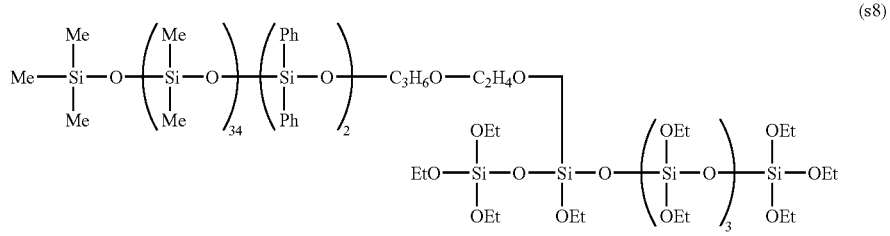
(s8)

Examples 8 to 10 and Comparative Example 6

Curable compositions were produced by the same method as in Example 7, except that the blend components and the blend amounts were changed as shown in Table 1.

TABLE 1

| Component (trade name) | Example 1 | 2 | 3 | 4 | 5 | 6 | 7 | 8 | 9 | 10 | Comparative Example 1 | 2 | 3 | 4 | 5 | 6 |
|---|---|---|---|---|---|---|---|---|---|---|---|---|---|---|---|---|
| Reaction curable silicone rubber (A) | | | | | | | | | | | | | | | | |
| KE44RTV (*1) | 50 | | | | 50 | | | | | | 65 | | 50 | | | |
| KE445RTV (*2) | | 65 | | 60 | | 50 | | | | | | 65 | | | 50 | |
| TSE389 (*3) | | | 50 | | | | | | | | | | | 50 | | |
| YF3057 (*9) | | | | | | | 70 | 65 | 70 | 65 | | | | | | 80 |
| Organopolysiloxane mixture (B) | | | | | | | | | | | | | | | | |
| X-31-2396 (*4) | 15 | 10 | 20 | 10 | 20 | 25 | 15 | 15 | | | | | | | | |
| X-31-2442 (*13) | | | | | | | | | 15 | 15 | | | | | | |
| Silicone oil (C) | | | | | | | | | | | | | | | | |
| TSF431 (*5) | | | | 5.0 | | | | | | | | 10 | | | | |
| KF-6011 (*6) | | | | | 5.0 | | | | | | | | 25 | | | |
| X-22-163C (*7) | | | | | | | | | | | | | | 20 | | |
| BCA-011 (*8) | | | | | | | | | | | | | | | 25 | |
| KF-50-3000 (*10) | | | | | | | | 5 | | 5 | | | | | | |
| Ethyl silicate 40WN (*11) | | | | | | | | | | | | | | | | 2.0 |
| NEOSTAN U-100 (*12) | | | | | | | 0.7 | 0.7 | 0.7 | 0.7 | | | | | | 0.7 |
| Xylene | 35 | 25 | 30 | 25 | 25 | 25 | 14.3 | 14.3 | 14.3 | 14.3 | 35 | 25 | 25 | 30 | 25 | 17.3 |
| Total | 100 | 100 | 100 | 100 | 100 | 100 | 100 | 100 | 100 | 100 | 100 | 100 | 100 | 100 | 100 | 100 |

*Units in the table: weight by parts

Remarks:
(*1): one-component RTV silicone rubber, manufactured by Shin-Etsu Chemical Co., Ltd., viscosity: 70 Pa · s
(*2): one-component RTV silicone rubber, manufactured by Shin-Etsu Chemical Co., Ltd., viscosity: 5 Pa · s
(*3): one-component RTV silicone rubber, manufactured by Toshiba Silicone Co., Ltd., viscosity: 5.6 Pa · s
(*4): organopolysiloxane mixture, manufactured by Shin-Etsu Chemical Co., Ltd., viscosity: 175 mPa · s
(*5): dimethylphenyl silicone oil, manufactured by Toshiba Silicone Co., Ltd., dynamic viscosity: $100 \times 10^{-6}$ m$^2$/s
(*6): polyether-modified silicone oil, manufactured by Toshiba Silicone Co., Ltd., dynamic viscosity: $130 \times 10^{-6}$ m$^2$/s
(*7): epoxy-modified silicone oil, manufactured by Shin-Etsu Chemical Co., Ltd., dynamic viscosity: $120 \times 10^{-6}$ m$^2$/s
(*8): organopolysiloxane, manufactured by Shin-Etsu Chemical Co., Ltd., synthetic organosilane, dynamic viscosity: $80 \times 10^{-6}$ m$^2$/s
(*9): two-component RTV silicone rubber, manufactured by Toshiba Silicone Co., Ltd., viscosity: 3 Pa · s
(*10): dimethylphenyl silicone oil, manufactured by Shin-Etsu Chemical Co., Ltd., viscosity: 3000 mPa · s
(*11): condensation product of ethyl silicate, manufactured by Wacker Chemie AG., viscosity: 3.0 to 6.0 mPa · s
(*12): dibutyltin dilaurate, manufactured by Nitto Kasei Co., Ltd.
(*13): organopolysiloxane mixture, manufactured by Shin-Etsu Chemical Co., Ltd., viscosity: 88 mPa · s
Measuring conditions of viscosity: 25° C., B type rotation viscometer, according to JIS Z 8803.
Measuring conditions of dynamic viscosity: 25° C., Ostwald viscometer, according to JIS Z 8803.

<Evaluation Methods>
(1) Static Friction Coefficient of Coating Film:

On each of the paint compositions produced in the manners described above, the paint composition was applied to a glass plate of 100×100×1 mm so that a thickness of a dried coating film was 150 μm, and was dried at room temperature for 5 days to obtain a test plate. This test plate was put on a sliding angle meter (refer to FIGS. 1 and 2), and 0.2 ml of distilled water was allowed to quietly fall on a coating film surface on the test plate from an injection syringe while maintaining the plate horizontal. Then, a gradient angle of the test plate was gradually raised to measure an angle (θ) at which the water droplet started falling. This measurement was repeated three times to determine an average value of the angles (θ). Then, a static friction coefficient α (α=tan θ) of the coating film was determined based on the average value of the angle (θ). The results are shown in Table 2.

(2) Adhesion of Coating Film:

On each of the paint compositions produced in the manners described above, the paint composition was applied to a surface of a steel plate of 70×150×0.8 mm, which was coated in advance with a zinc epoxy shop primer (a thickness of a dried coating film: 20 μm) and an epoxy rust preventive paint (a thickness of a dried coating film: 200 μm), so that a thickness of a dried coating film was 150 μm, and was dried at room temperature for 5 days to obtain a test plate. An aluminum-made cylinder (Φ: 6 mm, height: 5 mm) was adhered on a coated surface of the above test plate with an epoxy adhesive, and after a day, the aluminum-made cylinder was pulled horizontally by means of a peeling test device (FIG. 3) to measure the adhesion. This measurement was repeated three times to determine an average value of the adhesion. The results are shown in Table 3.

(3) Antifouling Performance of Coating Film:

On each of the paint compositions produced in the manners described above, the paint composition was applied to a surface of a sand blast-treated steel plate of 100×300×2.3 mm, which was coated in advance with a zinc epoxy shop primer (a thickness of the dried coating film: 20 μm) and an epoxy rust preventive paint (a thickness of the dried coating film: 200 μm), so that a thickness of a dried coating film was 150 μm, and was dried at room temperature for 5 days to obtain a test plate. This test plate was dipped and left standing still in Miyajima Bay of Hiroshima prefecture for 36 months, and then the surface thereof was visually observed to evaluate an antifouling performance of the coating film. The results are shown in Table 4.

The following evaluation criteria were applied.

No adhered lives: proportion of the area of adhesion of lives based on a surface area of the coating film is 0%

Adhered lives 10%: proportion of the area of adhesion of lives based on a surface area of the coating film is 10%

Adhered lives 20%: proportion of the area of adhesion of lives based on a surface area of the coating film is 20%

Adhered lives 50%: proportion of the area of adhesion of lives based on a surface area of the coating film is 50%

Adhered lives 70%: proportion of the area of adhesion of lives based on a surface area of the coating film is 70%

Adhered lives 100%: proportion of the area of adhesion of lives based on a surface area of the coating film is 100%

(B1) an organopolysiloxane represented by the following Formula (1):

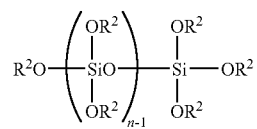

Formula (1)

wherein, in Formula (1), n is an integer of 2 or more and a plurality of $R^2$ each is independently a non-substituted or substituted monovalent hydrocarbon group having 1 to 8 carbon atoms, and

TABLE 2

| Physical property | Composition | | | | | | | | | | | | | | | |
|---|---|---|---|---|---|---|---|---|---|---|---|---|---|---|---|---|
| | Examples | | | | | | | | | | Comparative Examples | | | | | |
| | 1 | 2 | 3 | 4 | 5 | 6 | 7 | 8 | 9 | 10 | 1 | 2 | 3 | 4 | 5 | 6 |
| Sliding angle (θ) | 5.42 | 5.73 | 5.36 | 5.39 | 5.31 | 5.28 | 5.32 | 5.27 | 5.29 | 5.24 | 12.9 | 10.7 | 11.1 | 10.3 | 9.6 | 11.9 |
| Static friction coefficient (α) | 0.095 | 0.1 | 0.094 | 0.094 | 0.093 | 0.092 | 0.093 | 0.092 | 0.093 | 0.092 | 0.229 | 0.189 | 0.196 | 0.182 | 0.169 | 0.211 |

TABLE 3

| | Composition | | | | | | | | | | | | | | | |
|---|---|---|---|---|---|---|---|---|---|---|---|---|---|---|---|---|
| | Examples | | | | | | | | | | Comparative Examples | | | | | |
| | 1 | 2 | 3 | 4 | 5 | 6 | 7 | 8 | 9 | 10 | 1 | 2 | 3 | 4 | 5 | 6 |
| Adhesion (g/cm²) | 88.5 | 120.3 | 63.0 | 76.8 | 58.6 | 53.3 | 58.1 | 52.4 | 54.8 | 51.7 | 766.1 | 207.3 | 587.4 | 184.9 | 151.5 | 147.6 |

TABLE 4

| | Composition | | | | | | | | | | | | | | | |
|---|---|---|---|---|---|---|---|---|---|---|---|---|---|---|---|---|
| | Examples | | | | | | | | | | Comparative Examples | | | | | |
| | 1 | 2 | 3 | 4 | 5 | 6 | 7 | 8 | 9 | 10 | 1 | 2 | 3 | 4 | 5 | 6 |
| | Antifouling property (adhered lives) | | | | | | | | | | | | | | | |
| 6 months | None | None | None | None | None | None | None | None | None | None | 50% | 20% | None | None | None | 20% |
| 12 months | None | None | None | None | None | None | None | None | None | None | 100% | 50% | None | 20% | None | 50% |
| 18 months | None | None | None | None | None | None | None | None | None | None | 100% | 100% | 20% | 50% | None | 70% |
| 24 months | None | None | None | None | None | None | None | None | None | None | 100% | 100% | 50% | 70% | 10% | 100% |
| 30 months | None | None | None | None | None | None | None | None | None | None | 100% | 100% | 100% | 100% | 50% | 100% |
| 36 months | None | None | None | None | None | None | None | None | None | None | 100% | 100% | 100% | 100% | 100% | 100% |

The invention claimed is:

1. A curable composition obtained by mixing:

(A) 100 parts by weight of a reaction curable silicone rubber with:

(B) 1 to 100 parts by weight of an organopolysiloxane mixture comprising a product obtained by an $R^2OH$ elimination reaction of:

(B2) an organopolysiloxane having at least one structure represented by Formula (2) in a molecule:

OH  Formula (2)

wherein, in Formula (2), $R^3$ is a non-substituted or substituted divalent hydrocarbon group or a divalent hydrocarbon group having an ether bond, provided that when $R^3$ in Formula (2) is the divalent hydrocarbon group having an ether bond, excluded is an organopolysiloxane in which two or more trimethylsiloxy groups are bonded to a Si atom directly linked to a carbon atom of $R^3$.

2. The curable composition as described in claim 1, wherein the organopolysiloxane (B2) has a phenyl group.

3. The curable composition as described in claim 2, obtained by further mixing 0.1 to 200 parts by weight of a silicone oil (C), provided that the reaction curable silicone rubber (A) and the organopolysiloxane mixture (B) comprising the product are excluded from the silicone oil (C), based on total 100 parts by weight of the reaction curable silicone rubber (A) and the organopolysiloxane mixture (B).

4. The curable composition as described in claim 3, wherein the silicone oil (C) is methylphenyl silicone oil and/or polyether-modified silicone oil.

5. The curable composition as described in claim 3, wherein the silicone oil (C) is an organopolysiloxane having at least one group represented by the following Formula (3) in a molecule:

   Formula (3)

wherein, in Formula (3), $R^4$ is a non-substituted or substituted divalent hydrocarbon group or a divalent hydrocarbon group having an ether bond;
$R^5$ is a non-substituted or substituted monovalent hydrocarbon group;
Y is a hydrolyzable group; and
b is 0, 1 or 2,
provided that when $R^4$ in Formula (3) is the divalent hydrocarbon group having an ether bond, excluded is an organopolysiloxane in which two or more trimethylsiloxy groups are bonded to a Si atom directly linked to a carbon atom of $R^4$.

6. The curable composition as described in claim 2, obtained by further mixing additives selected from the group consisting of a curing catalyst, an antifouling agent and a colorant.

7. An antifouling paint composition comprising the curable composition of claim 2.

8. An antifouling coating film formed from the antifouling paint composition of claim 7.

9. A base material with an antifouling coating film, coated with the antifouling coating film of claim 8.

10. An underwater structure with an antifouling coating film, coated with the antifouling coating film of claim 8.

11. A ship outside plate with an antifouling coating film, coated with the antifouling coating film of claim 8.

12. An antifouling method for a base material comprising coating a surface of the base material with the antifouling coating film of claim 8.

13. The curable composition as described in claim 1, obtained by further mixing 0.1 to 200 parts by weight of a silicone oil (C), provided that the reaction curable silicone rubber (A) and the organopolysiloxane mixture (B) comprising the product are excluded from the silicone oil (C), based on total 100 parts by weight of the reaction curable silicone rubber (A) and the organopolysiloxane mixture (B).

14. The curable composition as described in claim 13, wherein the silicone oil (C) is methylphenyl silicone oil and/or polyether-modified silicone oil.

15. The curable composition as described in claim 13, wherein the silicone oil (C) is an organopolysiloxane having at least one group represented by the following Formula (3) in a molecule:

   Formula (3)

wherein, in Formula (3), $R^4$ is a non-substituted or substituted divalent hydrocarbon group or a divalent hydrocarbon group having an ether bond;
$R^5$ is a non-substituted or substituted monovalent hydrocarbon group;
Y is a hydrolyzable group; and
b is 0, 1 or 2,
provided that when $R^4$ in Formula (3) is the divalent hydrocarbon group having an ether bond, excluded is an organopolysiloxane in which two or more trimethylsiloxy groups are bonded to a Si atom directly linked to a carbon atom of $R^4$.

16. The curable composition as described in claim 1, obtained by further mixing additives selected from the group consisting of a curing catalyst, an antifouling agent and a colorant.

17. An antifouling paint composition comprising the curable composition of claim 1.

18. An antifouling coating film formed from the antifouling paint composition of claim 17.

19. An underwater structure with an antifouling coating film, coated with the antifouling coating film of claim 18.

20. A ship outside plate with an antifouling coating film, coated with the antifouling coating film of claim 18.

21. An antifouling method for a base material comprising coating a surface of the base material with the antifouling coating film of claim 18.

22. A base material with an antifouling coating film, coated with the antifouling coating film of claim 18.

23. A curable composition comprising:
(a) an organopolysiloxane having a hydroxyl group and/or an alkoxyl group and
(b) a product obtained by an $R^2OH$ elimination reaction of:
(B1) an organopolysiloxane represented by the following Formula (1):

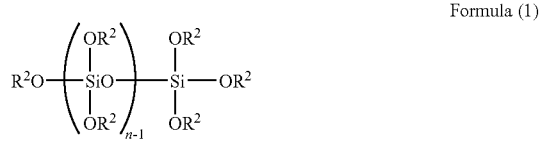

Formula (1)

wherein, in Formula (1), n is an integer of 2 or more, and
a plurality of $R^2$ each is independently a non-substituted or substituted monovalent hydrocarbon group having 1 to 8 carbon atoms, and
(B2) an organopolysiloxane having at least one structure represented by the following Formula (2) in a molecule:

   Formula (2)

wherein, in Formula (2), $R^3$ is a non-substituted or substituted divalent hydrocarbon group or a divalent hydrocarbon group having an ether bond, provided that when $R^3$ in Formula (2) is the divalent hydrocarbon group having an ether bond, excluded is an organopolysiloxane in which two or more trimethylsiloxy groups are bonded to a Si atom directly linked to a carbon atom of $R^3$.

24. An antifouling paint composition comprising the curable composition of claim 23.

25. An antifouling coating film formed from the antifouling paint composition of claim 24.

26. A base material with an antifouling coating film, coated with the antifouling coating film of claim 25.

27. An underwater structure with an antifouling coating film, coated with the antifouling coating film of claim 25.

28. A ship outside plate with an antifouling coating film, coated with the antifouling coating film of claim 25.

29. An antifouling method for a base material comprising coating a surface of the base material with the antifouling coating film of claim 25.

* * * * *